United States Patent
Ryman (10) Patent No.: US 8,401,777 B2
(45) Date of Patent: Mar. 19, 2013

(54) SYSTEM FOR WIRELESS TRANSMISSION OF MEASUREMENT RESULTS INTENTED TO BE USED IN A COUPLING DEVICE AND A USE OF THE SYSTEM IN A VEHICLE

(76) Inventor: Morgan Ryman, Anderstorp (SE)

( * ) Notice: Subject to any disclaimer, the term of this patent is extended or adjusted under 35 U.S.C. 154(b) by 503 days.

(21) Appl. No.: 12/226,988

(22) PCT Filed: May 7, 2007

(86) PCT No.: PCT/SE2007/000434
§ 371 (c)(1),
(2), (4) Date: Nov. 25, 2008

(87) PCT Pub. No.: WO2007/129958
PCT Pub. Date: Nov. 15, 2007

(65) Prior Publication Data
US 2010/0057296 A1   Mar. 4, 2010

(30) Foreign Application Priority Data
May 9, 2006   (SE) ........................ 0601035

(51) Int. Cl.
*G07C 5/00*   (2006.01)
(52) U.S. Cl. .................... 701/123; 701/34.4; 455/69
(58) Field of Classification Search .............. 701/29, 701/36, 123, 29.1, 34.4; 455/67.11, 69; 174/47
See application file for complete search history.

(56) References Cited

U.S. PATENT DOCUMENTS

| | | | |
|---|---|---|---|
| 5,461,385 A * | 10/1995 | Armstrong | 342/42 |
| 6,546,795 B1 | 4/2003 | Dietz | |
| 6,649,829 B2 | 11/2003 | Garber et al. | |
| 6,950,008 B2 * | 9/2005 | Hagl et al. | 340/5.61 |
| 7,158,897 B2 * | 1/2007 | Kolosov et al. | 702/50 |
| 7,642,742 B2 * | 1/2010 | Curello et al. | 320/101 |
| 7,747,344 B2 * | 6/2010 | O'Dougherty et al. | 700/231 |
| 2003/0218335 A1 * | 11/2003 | Takayanagi | 285/319 |
| 2004/0129092 A1 | 7/2004 | Dietzel | |
| 2005/0022581 A1 | 2/2005 | Sunshine | |

FOREIGN PATENT DOCUMENTS

| | | |
|---|---|---|
| DE | 0103434 | 8/2001 |
| DE | 10018621 | 10/2001 |
| DE | 10144552 | 2/2004 |
| GB | 2308947 | 7/1997 |
| GB | 2391319 | 2/2004 |
| JP | 2004-537685 | 12/2004 |

(Continued)

OTHER PUBLICATIONS

Text of Chinese Office Action, issued in Chinese Patent Application No. 2007800169677.

(Continued)

*Primary Examiner* — Paul N Dickson
*Assistant Examiner* — Timothy Wilhelm
(74) *Attorney, Agent, or Firm* — Harness, Dickey & Pierce, PLC (57) ABSTRACT

A coupling device (1) for gas and liquid systems comprises a passive transponder and at least one sensor for measuring at least one quantity. The transponder is connected to the sensor and arranged to wirelessly transmit and receive data via communication protocols. Moreover the sensor is passive, connected to and integrated with the transponder, the sensor being activated with energy induced by the transponder. An independent claim is included for a use of a wireless transmission system in a vehicle.

7 Claims, 4 Drawing Sheets

FOREIGN PATENT DOCUMENTS

| | | |
|---|---|---|
| JP | 2005-134957 | 5/2005 |
| JP | 2005-518579 | 6/2005 |
| JP | 2006-85225 | 3/2008 |
| WO | WO 02/073523 | 9/2002 |
| WO | WO 020773523 | 9/2002 |
| WO | WO 02/094707 | 11/2002 |
| WO | WO 02/100728 A2 | 12/2002 |
| WO | WO 03/065326 | 8/2003 |
| WO | WO 2004014009 | 2/2004 |
| WO | WO 2005078330 | 8/2005 |

OTHER PUBLICATIONS

English Translation of Japanese Office Action dated Apr. 20, 2012, issued in Japanese Patent Application No. 2009-509482.

Dec. 20, 2012 European Search Report issued in EP 07748098.6.

* cited by examiner

SYSTEM FOR WIRELESS TRANSMISSION OF MEASUREMENT RESULTS INTENTED TO BE USED IN A COUPLING DEVICE AND A USE OF THE SYSTEM IN A VEHICLE

FIELD OF THE INVENTION

The present invention relates to a coupling device for gas and liquid systems, comprising a passive transponder and at least one sensor for measuring one or more quantities, the transponder being connected to the sensor and arranged to wirelessly transmit and receive data via communication protocols.

BACKGROUND ART

Such coupling devices are used in many applications, for example in vehicles, in fixed installations and in various types of machine constructions. In most cases, the sealing function of the coupling device is essential as are also reliability, price and handling aspects, including time required for mounting.

Furthermore, continuously increased demands are placed on engines as to, for example, performance, environmental influence and life. In order to satisfy these requirements, it is therefore necessary for the control systems to have the current status of flow rates, temperatures etc. for gases and liquids in the engine. Such information in real time from different parts of an engine therefore makes it possible to optimise operation.

One example of wireless communication is disclosed in U.S. Pat. No. 6,649,829 which uses RFID technology (RFID=radio frequency identification). The sensors in said document are, however, relatively expensive and beside require direct connection to a power source, such as a battery. The exchange of batteries involves an extra operation and thus causes inconvenience for the user.

RFID can be resembled to "electronic bar codes", but with the difference that the RFID tag (RFID transponder) need not be visible for reading. An RFID system usually comprises readers with antenna and a data carrier with the unique code. As a rule, the data carrier is encapsulated to optimally fit the application. The most common encapsulating materials are different types of plastic; proximity to metal shields the product and greatly affects the performance of the system. RFID systems are available with active and passive transponders.

An active transponder has a power source (battery) of its own to be able to perform reception and transmission, a common reading distance being about 10 m.

A passive RFID system can be described as a radio system for short distances. The transponder has no power source of its own but is operated with the power induced by the antenna. The reading distance is usually below 0.5 m. The reading distance is highly dependant on the output power of the reader, the antenna size in both reader and transponder and also the ambient conditions, where metal usually has a negative effect on performance.

SUMMARY OF THE INVENTION

The object of the present invention therefore is to provide a coupling device, especially a quick coupling for gas and liquid systems, for a wireless signal system which compared to prior art is easier and less expensive both to produce and install and which requires less maintenance. By "quick coupling" is meant a coupling device which without complicated or time-consuming measures can be assembled and which comprises a locking function in the assembled state.

According to the invention, this object is achieved by the coupling device of the type stated by way of introduction being given the features that are defined in claim 1. Preferred embodiments of the coupling device are defined in the dependent claims.

The inventive coupling device, especially a quick coupling, for gas and liquid systems comprises a passive transponder and at least one sensor for measuring at least one quantity, the transponder being connected to the sensor and arranged to wirelessly transmit and receive data via communication protocols, wherein the sensor is passive and integrated with the transponder, and wherein the sensor is activated with energy induced by the transponder.

By "passive" is meant that the reading of the sensor occurs without supply of energy other than by said inducing.

By "integrated" is further meant that the parts constitute a non-dismountable unit. Furthermore "quick coupling" relates to a coupling device for connecting gas or liquid conduits which does not require any tools for mounting and is lockable in the assembled state.

There are fields of application for components of this type both in liquid-based cooling systems and gas-based turbo systems. An "intelligent" cooling system is adaptive and conducts the coolant to the position where it is currently needed, by electrically driven pumps and valve systems. The accuracy requirements placed on the sensor are "normal", but the environmental requirements are stringent, as are also the requirements as to life and freedom of maintenance. A gain that can be achieved is reduction of weight/volume of the cooling system, which in turn may result in saving in costs in manufacture as well as in operation.

Sensors for turbo systems must have a significantly faster response time than cooling systems since the information is to be used to control the power output of the engine etc. In the worst operation situation, the sensors must also resist considerably higher temperatures. As for the rest, the requirements as to environment and life are equivalent to those of the liquid systems. The gains that can be expected with systems of this kind are improved engine performance and/or lower fuel consumption. Information on suitable quantities contains, for instance, pressure, temperature and flow rate.

Preferably, the coupling device comprises a processor/signal processing unit which most preferably is integrated with the sensor and the transponder.

In a variant of the invention, the sensor, or the sensor and the transponder are arranged in a sealing ring in the coupling device. This results in the advantage that a sensor can easily sense whether the connection between, for example, the female part and the male part is in its locked final position by using a pressure transducer. As an alternative, or in addition, it is possible to arrange a position-detecting sensor.

Pressures and temperatures can be measured by means of integrated sensor elements which are manufactured using what is referred to as the MEMS technology (Micro Electro Mechanical Systems). This technology has obtained most process properties from production of integrated electronics, that is a technology involving high-definition patterns on silicon. A new property of the MEMS technology is the option of integrating entirely mechanical functional elements. In pressure sensors, thin membranes are used in combination with evacuated cavities as vacuum reference. The signals representing pressure, temperature, flow rate etc. can be provided either as a varying resistance (piezoresistive technology) or capacitance and require certain signal processing in order to allow handling in, for instance, a digital data communication system. The piezoresistive technology is the most common since it is advantageous in terms of immunity to noise and simpler circuitries, but the capacitive technology results in most cases in lower power consumption and can be used at higher temperatures. However, in most cases the encapsulation is the limiting factor to temperature resistance.

Preferably, two or more sensors are arranged in the coupling device. In most cases, values of flow rate, temperature and pressure are desired, but also other quantities can be involved.

The coupling device according to the present invention is preferably adjusted to a high frequency system. Low frequency systems LF (125 kHz), usually a standard in, for instance, access control systems, are used in difficult environments, metal etc. There are, however, only a few ISO standards for this frequency. A transponder antenna Ø50 mm has typically about 500 turns, which in addition makes manufacture complicated. With prior art technique, the high frequency range HF (13.56 MHz) seems to be most appropriate for the present invention. This is partly due to the fact that there are two accepted standards, ISO 14443, standard for payment transactions using contactless technology, for instance public transports, and ISO 15693, standard for logistics but also applicable in most other fields since there are many types of chips according to this standard.

A transponder antenna Ø50 mm for HF typically has about 10 turns, which means that manufacture is considerably easier than for low frequency products; for instance it is possible to etch antennas similar to printed cards. Ultrahigh frequency UHF (>400 MHz) is relatively new in passive RFID systems. The transponder usually has an etched dipole antenna which must be adjusted to the base to which it is to be applied.

There are many different types of chips in the different frequency bands, but the high frequency band currently tends to have the greatest assortment and variations according to the current standard.

If smaller antennas are used, one antenna for each measuring point, the need for readers with high output power is reduced. However, a polling function must be added for reading of all measuring points in a predetermined order and at correct intervals. At the time of positioning transponder and reader antennas, tests must be made to determine the output power of the reader units.

The present invention also relates to a wireless signal transmission system for vehicles, especially engine compartments, which comprises a coupling device as stated above.

The completed system is preferably integrated at several system levels:
1) Vehicle system level, communication preferably occurs "upwards"/"outwards" via the CAN bus system. This provides the possibility of customising the system to individual vehicle manufacturers.
2) The central unit/reader is preferably placed in the engine compartment (for instance the underside of the bonnet). It is also possible to use a plurality of antenna coils when a plurality of connecting points/sensors are to be addressed individually without problems of crosstalk/interference. The central unit is preferably based on general hardware, but with exchangeable and customised software.
3) The transponder units are preferably made in several models (physical size, design, choice of measuring quantity). For example, they can be built on a flexible printed card laminate which also comprises the antenna coil, and which is moulded into the quick coupling.
4) Each sensor chip can be provided with an ASIC (Application Specific Integrated Circuit) for local processing of the sensor signals. This results in the advantage that the sensor signals need not be calibrated. The local micro processor of the transponder preferably is a standard IC, FPGA (Field Programmable Gate Array) or ASIC. It is also possible to combine a plurality of ASIC circuits to a single circuit for additional saving in costs, subject to increased complexity and a risk of lower production yield.

BRIEF DESCRIPTION OF THE DRAWINGS

The invention will in the following be additionally described by way of example and with reference to the accompanying drawings.

DESCRIPTION OF PREFERRED EMBODIMENTS

Figure 1A:
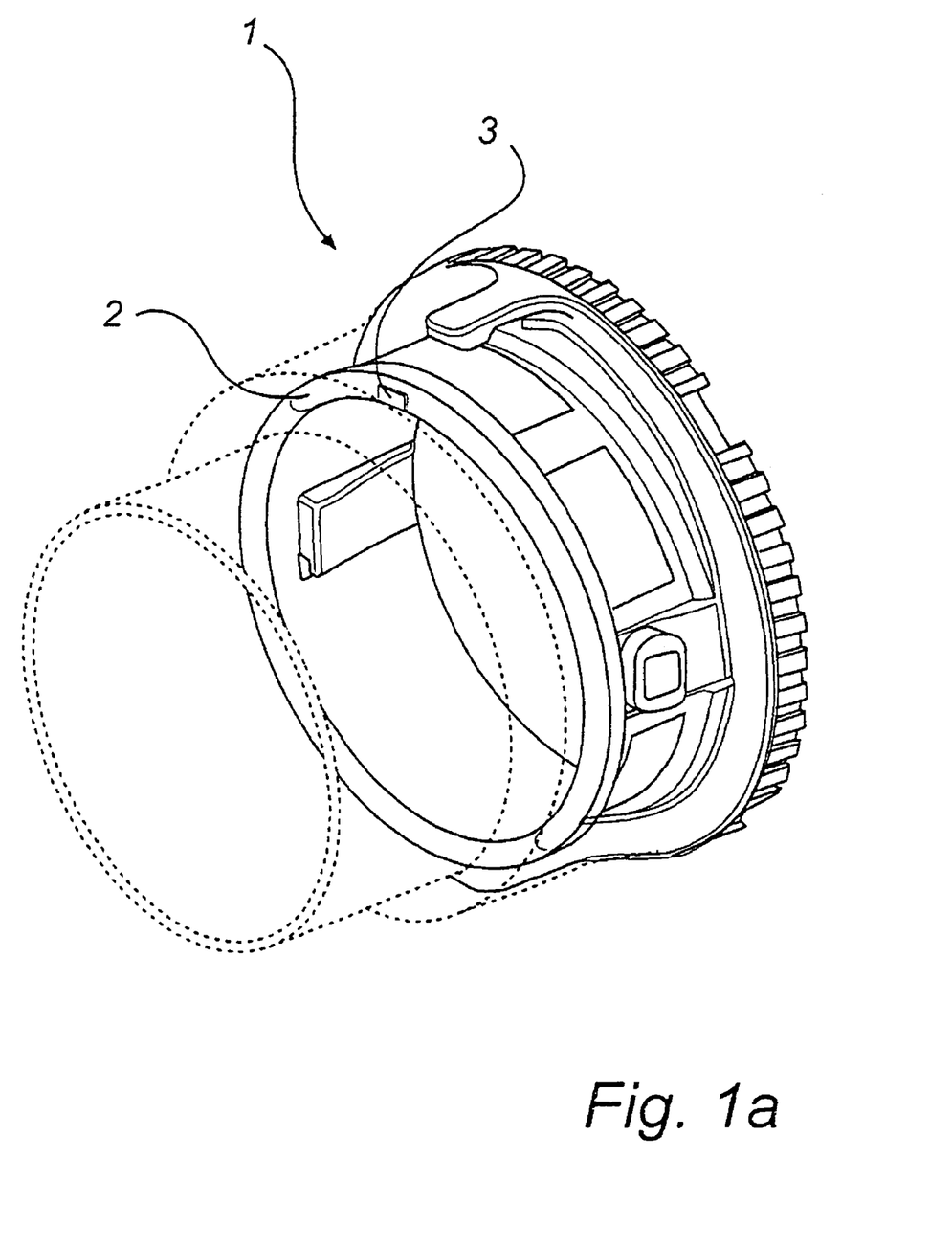
FIG. 1a is a perspective view of a portion of a coupling device according to the present invention.
Figure 1B:
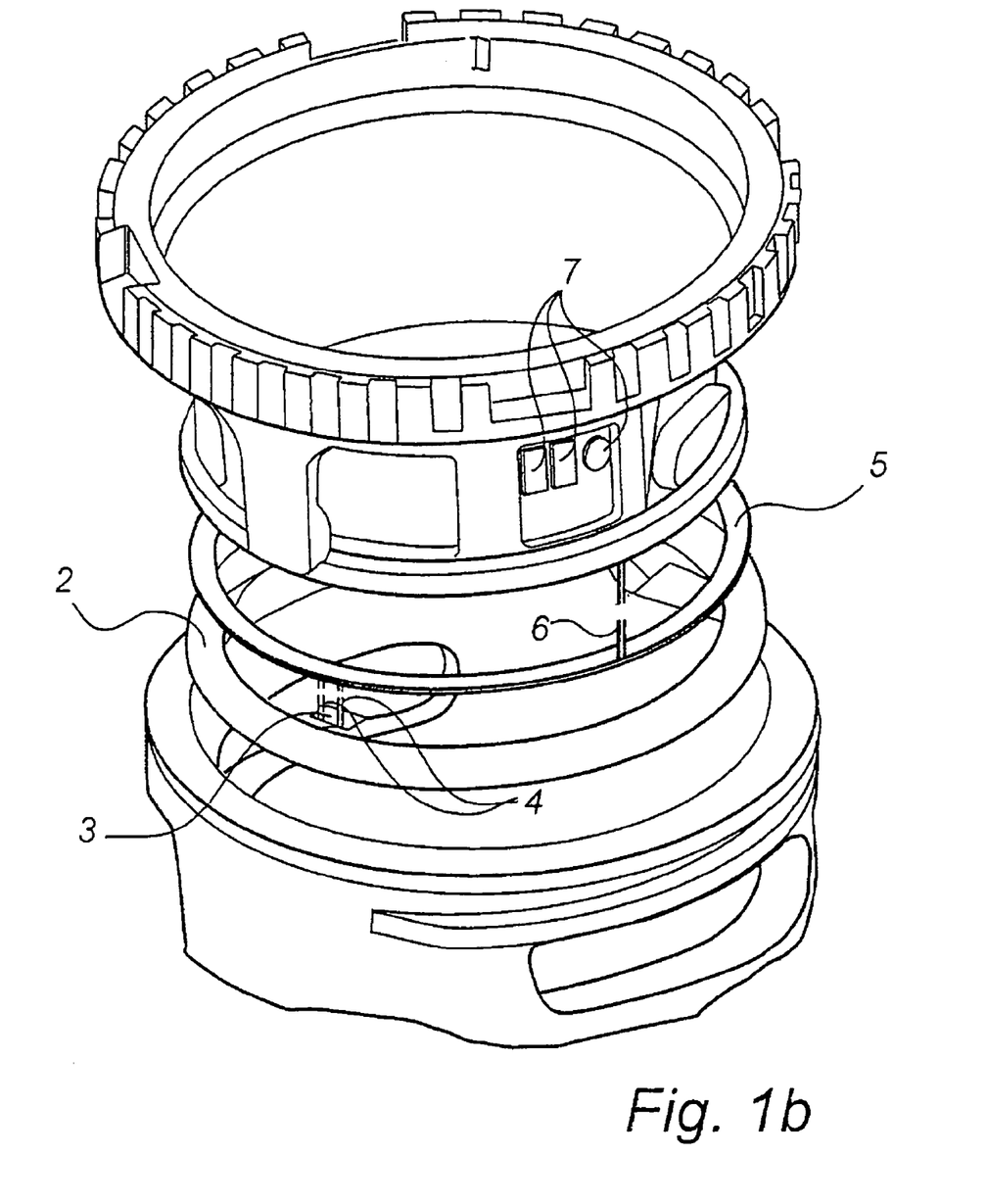
FIG. 1b is an exploded view of a coupling device according to the present invention.

FIG. 1a illustrates a coupling device 1 with a sealing ring 2 with a sensor/transponder 3. FIG. 1b illustrates an alternative embodiment of a coupling device according to the present invention. Like in FIG. 1a, the coupling device comprises a transponder 3 and a sealing ring 2. In this embodiment, the sensor/transponder 3 is connected via a coupling 4 to an antenna coil 5. In the assembled state, the coupling 4 is not visible since the sensor/transponder 3 in this embodiment is in contact with the antenna coil 5. The coupling 4 is illustrated for simplified understanding. By means of the antenna coil 5, power is generated when a magnetic field is transmitted from a control unit (not shown). In another alternative embodiment, the antenna coil 5 is connected via a second coupling 6 to a unit 7 for external communication. Like in the case of the coupling 4 above, the coupling 6 is in this embodiment not visible in the assembled state. In an alternative embodiment, the sensor is the unit that is arranged adjacent the sealing ring, that is the unit designated 3. In this case the transponder is the unit designated 7.

Figure 2:
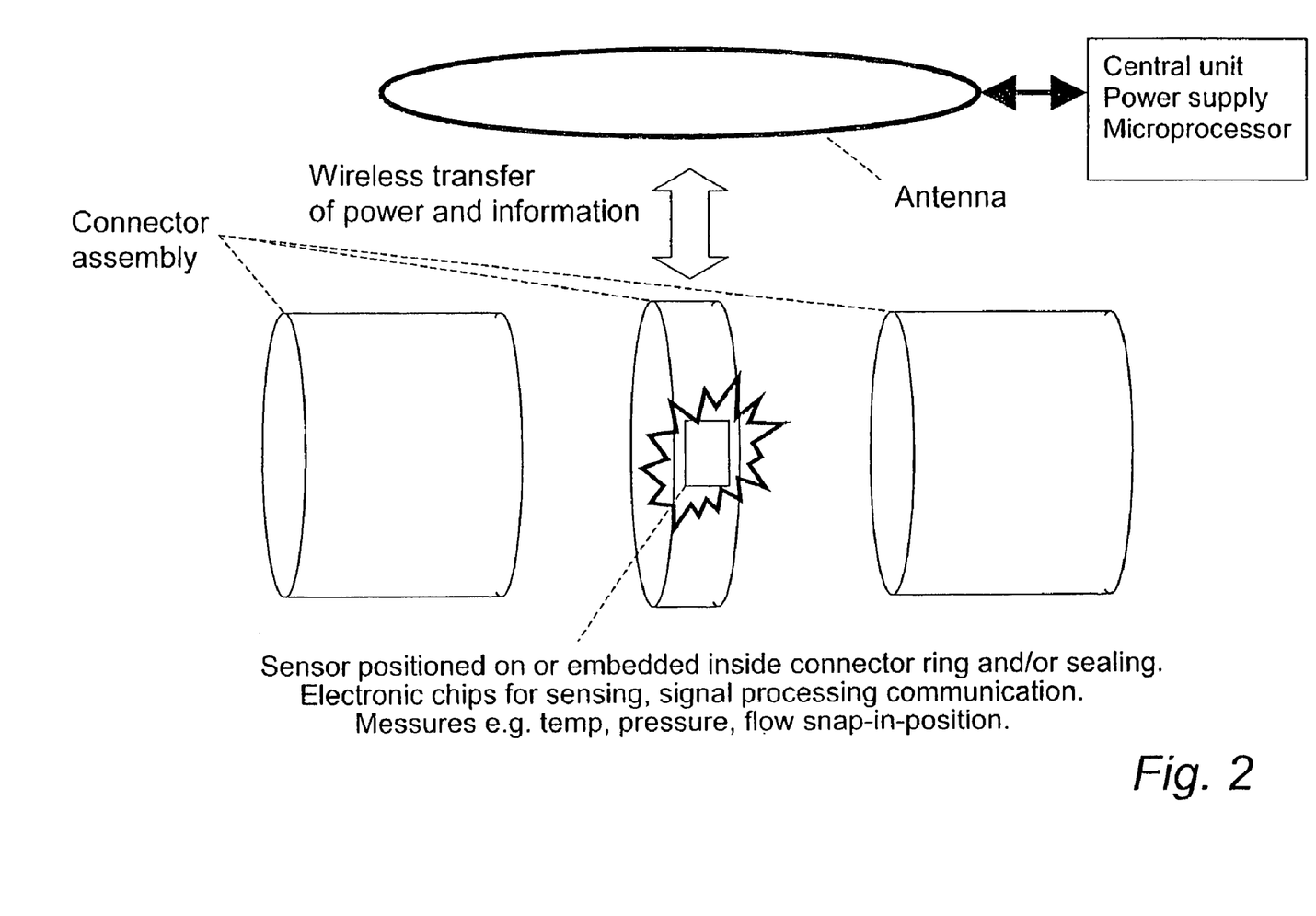
FIG. 2 illustrates the fundamental construction of a system according to the present invention.

FIG. 2 illustrates schematically the construction of the intended system. The sensor or the transponder is applied to or in embedded in the quick coupling and/or sealing ring and contains sensor chips for measuring temperature and pressure, one or more electronic chips for signal processing and data communication, and an antenna receiving radio waves from a larger antenna connected to a central unit, from which all control and checking of data communications occur. Also power transmission occurs via the same central unit. In addition to, for instance, measuring of pressure and temperature, the sensor should also provide position indication for the snap locking of the quick coupling.

Figure 3:
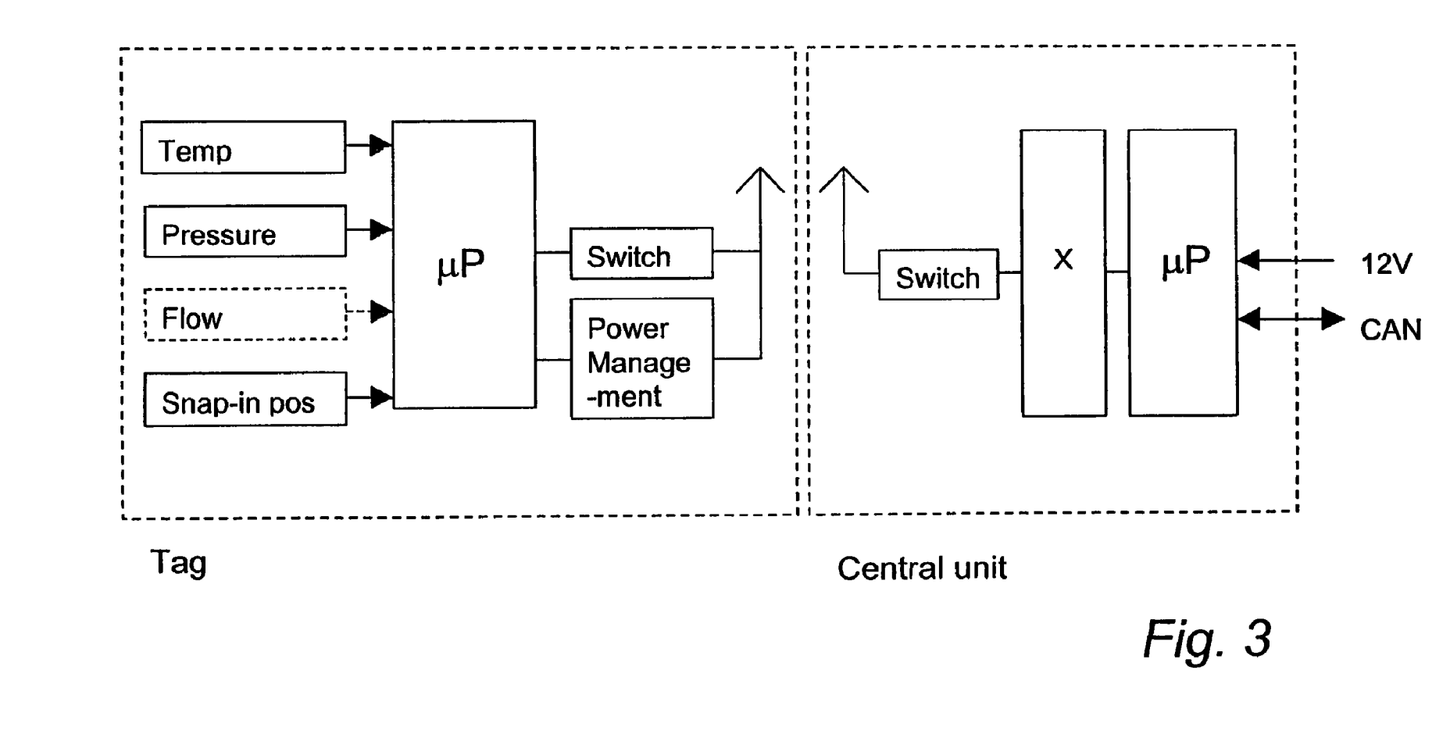
FIG. 3 is an example of a block diagram for the system according to the present invention.

FIG. 3 is a fundamental block diagram of the system according to an embodiment of the present invention. The sensors for pressure and temperature, snap locking and optionally flow rate supply measuring signals to a microprocessor on the transponder side. This microprocessor is a "slave" to the processor of the central unit which supplies commands and controls the data communication to the transponder.

The different blocks in FIG. 3 have the following functions: the blocks "temp", "pressure", "flow", "snap-in pos" indicate sensors for the respective measuring quantities as has been generally described above. The signals from the respective sensors are digitised by analogue/digital converters which according to prior art are often integrated in the block marked "µP" and indicate a general microprocessor according to prior art.

The microprocessor has the capacity of performing sequential, logic and arithmetic operations, and is controlled by a program stored in an integrated storage unit which allows both temporary and permanent storage of information. Output information from the microprocessor controls a switch which is directly connected to the antenna coil of the transponder (indicated as an upward arrow in the figure). The switch can also be used to receive pulsed information via the antenna. Furthermore the transponder part comprises an electronic circuit for power management. This circuit controls feed power to, inter alia, the sensors and the microprocessor and supplies signals if, for instance, the feed power is insufficient.

The microprocessor, the switch and the circuit for power management can preferably be integrated on one and the same chip and need not have physical dimensions greater than a square millimeter. The cost of manufacture will then be extremely low since thousands of units can be manufactured in parallel.

The central unit also comprises a microprocessor indicated "µP" in FIG. 3 having a considerably larger capacity than the one in the transponder part since the central unit is the main control unit of the system and in the normal case is to manage handling of a plurality of transponders.

The unit "X" is a buffer stage to a switch which in turn is connected to the antenna coil (indicated as an upward arrow). The buffer stage allows supplying the antenna coil with radio frequency signals of relatively high power in order to manage reasonable reading distances to the transponder part.

The switch makes it possible to control serial digital information transmission from the central unit to the transponder part, for instance, by switching between two power levels. The switch can also be used to reverse the flow of information. When the antenna coil of the transponder is switched between low and high impedence states, this can be detected as a wirelessly transmitted load change in the antenna coil of the central unit.

Protocols for this communication are available either as a freely available standard or in the form of licensed software products which are sold together with the processor chips. Many leading semiconductor manufacturers are selling such products. The central unit is driven by the accumulators of the vehicle, currently in most cases 12V DC, which will probably be increased to 48 V within the next few years. Data communication with other vehicle units usually occurs via a CAN bus, which is an established standard for data communication in the field of vehicles.

An example of a specification of requirements for two examples of fields of application is to be found in the table below:

|  | Liquid system | Turbo system |
|---|---|---|
| Temperature range | −40° C.-+150° C. | −40° C.-+260° C. |
| Pressure | 0-0.5 MPa | 0-0.5 MPa |
| Accuracy | ±1% of the measuring range | ±1% of the measuring range |

-continued

|  | Liquid system | Turbo system |
|---|---|---|
| Response time | 20-30 s | <1 s |
| Maintenance | Maintenance free | Maintenance free |
| Life | >that of the vehicle | >that of the vehicle |
| Inner diameter | 8-60 mm | 35-100 mm |

One way of measuring the flow rate is using information from two or more pressure or temperature sensors in the inlet and the outlet, respectively, of a conduit with a known flow resistance.

It will be appreciated that many modifications of the above described embodiments of the invention are conceivable within the scope of the invention, as defined by the appended claims.

The invention claimed is:

1. A coupling device for gas and liquid systems, the coupling device being arranged in an engine compartment of a vehicle, and the coupling device being a quick coupling including a first and a second coupling part, the coupling device comprising:
   a passive transponder, the passive transponder being configured to wirelessly transmit and receive data via communication protocols;
   at least one passive sensor configured to measure at least one quantity, the at least one passive sensor being connected to the passive transponder, the at least one passive sensor being activated with energy induced by the passive transponder; and
   an application specific integrated circuit (ASIC) configured to locally process sensor signals, the ASIC being integrated with the at least one passive sensor and the passive transponder, the ASIC being activated with the energy induced by the passive transponder, and wherein the passive transponder, the at least one passive sensor and the ASIC are arranged in a sealing ring, which sealing ring is arranged spatially between said first and second coupling parts.

2. The coupling device as claimed in claim 1, wherein the sealing ring is a non-conductive material.

3. The coupling device as claimed in claim 1, which is adapted to a high frequency system.

4. A wireless signal transmission system for vehicles, especially engine compartments, which comprises a coupling device as claimed in claim 1 and a reader configured to receive data from the coupling device, wherein the reader is arranged in the engine compartment of the vehicle.

5. The wireless signal transmission system as claimed in claim 4, wherein the reader comprises an antenna, and wherein the reader is arranged at an underside of a bonnet of the engine compartment.

6. The wireless signal transmission system as claimed in claim 4, wherein the reader comprises an antenna and a microprocessor in a unit, which unit is arranged to communicate wirelessly with the coupling device.

7. The wireless signal transmission system as claimed in claim 4, wherein the reader and the coupling device are separated by a distance of at least one of 0.25 meters, 0.5 meters, and 0.75 meters.

* * * * *

UNITED STATES PATENT AND TRADEMARK OFFICE
CERTIFICATE OF CORRECTION

| | |
|---|---|
| PATENT NO. | : 8,401,777 B2 |
| APPLICATION NO. | : 12/226988 |
| DATED | : March 19, 2013 |
| INVENTOR(S) | : Morgan Ryman |

It is certified that error appears in the above-identified patent and that said Letters Patent is hereby corrected as shown below:

On the title page, Item (54) and in the Specification, Col. 1 the Title should read:

SYSTEM FOR WIRELESS TRANSMISSION OF MEASUREMENT
RESULTS INTENDED TO BE USED IN A COUPLING DEVICE
AND A USE OF THE SYSTEM IN A VEHICLE

Signed and Sealed this
Second Day of July, 2013

Teresa Stanek Rea
*Acting Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 8,401,777 B2 | |
| APPLICATION NO. | : 12/226988 | |
| DATED | : March 19, 2013 | |
| INVENTOR(S) | : Morgan Ryman | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 685 days.

Signed and Sealed this
Ninth Day of December, 2014

Michelle K. Lee
*Deputy Director of the United States Patent and Trademark Office*